United States Patent
Florendo et al.

(10) Patent No.: US 11,726,985 B2
(45) Date of Patent: Aug. 15, 2023

(54) HYBRID IN-MEMORY/PAGEABLE SPATIAL COLUMN DATA

(71) Applicant: SAP SE, Walldorf (DE)

(72) Inventors: Colin Florendo, Marlborough, MA (US); Surendra Vishnoi, Jodhpur (IN); Janardhan Hungund, Pune (IN); Manuel Caroli, Mannheim (DE)

(73) Assignee: SAP SE, Walldorf (DE)

( * ) Notice: Subject to any disclaimer, the term of this patent is extended or adjusted under 35 U.S.C. 154(b) by 512 days.

(21) Appl. No.: 16/890,020

(22) Filed: Jun. 2, 2020

(65) Prior Publication Data

US 2020/0387502 A1    Dec. 10, 2020

Related U.S. Application Data

(60) Provisional application No. 62/858,693, filed on Jun. 7, 2019.

(51) Int. Cl.
*G06F 16/22* (2019.01)
*G06F 16/23* (2019.01)
(Continued)

(52) U.S. Cl.
CPC ........ *G06F 16/2379* (2019.01); *G06F 3/0604* (2013.01); *G06F 3/064* (2013.01); *G06F 3/0673* (2013.01); *G06F 9/4843* (2013.01); *G06F 12/0223* (2013.01); *G06F 12/0246* (2013.01); *G06F 12/0875* (2013.01); *G06F 12/0882* (2013.01); *G06F 16/221* (2019.01); *G06F 16/2219* (2019.01); *G06F 16/2228* (2019.01); *G06F 16/2237* (2019.01);
(Continued)

(58) Field of Classification Search
CPC ............ G06F 16/2255; G06F 16/2272; G06F 16/24558; G06F 16/221
See application file for complete search history.

(56) References Cited

U.S. PATENT DOCUMENTS 5,625,711 A * 4/1997 Nicholson ............ G06V 30/127
 382/229
5,729,637 A * 3/1998 Nicholson ............ G06V 30/268
 382/282
(Continued)

OTHER PUBLICATIONS

Abadi, S. et al., "The Design and Implementation of Modern Column Oriented Database Systems," Foundations and Trends in Databases, vol. 5, No. 3, Now Publishers Inc., 2012, pp. 177-280.
(Continued)

*Primary Examiner* — Eliyah S. Harper
(74) *Attorney, Agent, or Firm* — Sterne, Kessler, Goldstein & Fox P.L.L.C.

(57) ABSTRACT

Disclosed herein are system, method, and computer program product embodiments for maintaining of a geometric object in a database. An embodiment operates by a database maintaining a first page storing a data block in the database's on-disk store such that the data block stores at least one byte of the geometric object. After receiving the request for the geometric object, the database loads the page storing the geometric object in the in-memory store and determines the size of the geometric object. Based on the size of the geometric object, the database stores the geometric object in the in-memory store directly or in a heap of the in-memory store.

16 Claims, 8 Drawing Sheets

(51) Int. Cl.
  *G06F 12/02*     (2006.01)
  *G06F 3/06*      (2006.01)
  *G06F 12/0882*   (2016.01)
  *G06F 16/2455*   (2019.01)
  *G06F 12/0875*   (2016.01)
  *G06F 9/48*      (2006.01)

(52) U.S. Cl.
  CPC ...... *G06F 16/2255* (2019.01); *G06F 16/2272* (2019.01); *G06F 16/2282* (2019.01); *G06F 16/24552* (2019.01); *G06F 16/24558* (2019.01); *G06F 2212/1024* (2013.01); *G06F 2212/1044* (2013.01)

(56) References Cited

U.S. PATENT DOCUMENTS

| | | | | |
|---|---|---|---|---|
| 8,396,283 | B2* | 3/2013 | Iihoshi | G06T 7/521 |
| | | | | 382/106 |
| 8,736,701 | B2* | 5/2014 | Marman | H04N 9/7921 |
| | | | | 348/222.1 |
| 9,384,206 | B1* | 7/2016 | Bono | G06F 16/1756 |
| 9,817,858 | B2 | 11/2017 | Eisenreich et al. | |
| 9,852,169 | B2 | 12/2017 | Faerber et al. | |
| 2015/0209116 | A1* | 7/2015 | Jess | A61B 90/20 |
| | | | | 250/208.1 |
| 2015/0290795 | A1* | 10/2015 | Oleynik | B25J 9/0081 |
| | | | | 700/257 |
| 2016/0012089 | A1 | 1/2016 | Sherkat et al. | |
| 2016/0148000 | A1* | 5/2016 | Krutsch | G06V 10/50 |
| | | | | 380/28 |
| 2016/0188176 | A1* | 6/2016 | Runnels | B64G 3/00 |
| | | | | 715/788 |
| 2017/0023851 | A1* | 1/2017 | Chien | G03B 21/2046 |
| 2017/0322960 | A1 | 11/2017 | Glebe et al. | |
| 2020/0320159 | A1* | 10/2020 | Matthews | C09K 5/10 |
| 2020/0364452 | A1* | 11/2020 | Pellinen | G06F 40/30 |
| 2020/0387502 | A1* | 12/2020 | Florendo | G06F 16/2282 |

OTHER PUBLICATIONS

Aken, D.V. et al., "Automatic Database Management System Tuning Through Large-scale Machine Learning," ACM SIGMOD '17, May 14-19, 2017, pp. 1009-1024.

Alexiou, K. et al. "Adaptive Range Filters for Cold Data: Avoiding Trips to Siberia," Proc. of the VLDB Endowment, vol. 6, No. 14, 2013, pp. 1714-1725.

Anderson, T., "Microsoft SQL Server 14 man: Nothing stops a Hekaton transaction," The Register, printed from http://www.theregister.co.uk/2013/06/03/microsoft_sql_server_14_teched/, Jun. 3, 2013, 8 pages.

Andrei, M. et al., "SAP HANA Adoption of Non-Volatile Memory," Proc. of the VLDB Endowment, vol. 10, No. 12, 2017, pp. 1754-1765.

Anh, V.N. and Moffat, A., "Index compression using 64-bit words," Software—Practice and Experience, vol. 40, 2010, pp. 131-147.

Arulraj, J. et al., "Multi-Tier Buffer Management and Storage System Design for Non-Volatile Memory," arXiv:1901.10938v1 [cs.DB], Jan. 30, 2019, 17 pages.

Belazzougui, D. et al., "Hash, displace, and compress," Algorithms—ESA 2009, Proc. 17th Annual European Symposium, Copenhagen, Denmark, Sep. 7-9, 2009, pp. 682-603.

Bhattacharjee, B. et al., "Efficient Index Compression in DB2 LUW," VLDB '09, vol. 2, No. 2, 2009, pp. 1462-1473.

Do, J. et al., "Turbocharging DBMS Buffer Pool Using SSDs," ACM SIGMOD, 2011, pp. 1113-1124.

Eldawy, A. et al., "Spatial Partitioning Techniques in SpatialHadoop," Proc. of the VLDB Endowment, vol. 8, No. 12, 2015, pp. 1602-1605.

Elghandour, I. et al., "An XML Index Advisor for DB2," ACM SIGMOD'08, Jun. 9-12, 2008, 4 pages.

Finkelstein, S. et al., "Physical Database Design for Relational Databases," ACM Trans. on Database Systems, vol. 13, No. 1, Mar. 1988, pp. 91-128.

Graefe, G. et al., "In-memory Performance for Big Data," Proc. of the VLDB Endowment, vol. 8, No. 1, 2014, pp. 37-48.

Graefe, G., "Volcano—An Extensible and Parallel Query Evaluation System," IEEE Trans. on Knowledge and Data Engineering, vol. 6, No. 1, Feb. 1994, pp. 120-135.

Gurajada, A. et al., "BTrim—Hybrid In-Memory Database Architecture for Extreme Transaction Processing in VLDBs," Proc. of the VLDB Endowment, vol. 11, No. 12, 2018, pp. 1889-1901.

Lang, H. et al., Data Blocks: Hybrid OLTP and OLAP on Compressed Storage using both Vectorization and Compilation. ACM SIGMOD, 2016, pp. 311-326.

Larson, P. et al., "Real-Time Analytical Processing with SQL Server," Proc. of the VLDB Endowment, vol. 8, No. 12, Aug. 31-Sep. 4, 2015, pp. 1740-1751.

Lee, J. et al., "Hybrid Garbage Collection for Multi-Version Concurrency Control in SAP HANA," ACM SIGMOD, Jun. 26-Jul. 1, 2016, pp. 1307-1318.

Leis, V. et al., "LeanStore: In-Memory Data Management Beyond Main Memory," IEEE ICDE, 2018, pp. 185-196.

Lemke, C. et al., "Speeding Up Queries in Column Stores—A Case for Compression," DAWAK, 2010, pp. 117-129.

Liu, X. and Salem, K., "Hybrid Storage Management for Database Systems," Proc. of the VLDB Endowment, vol. 6, No. 8, Aug. 26-30, 2013, pp. 541-552.

Majewski, B.S. et al., "A Family of Perfect Hashing Methods," The Computer Journal, vol. 39, No. 6., 1996, pp. 547-554.

May, N. et al., "SAP HANA—The Evolution of an In-Memory DBMS from Pure OLAP Processing Towards Mixed Workloads," BTW, 2017, pp. 545-563.

Menon, P. et al., "Relaxed Operator Fusion for In-Memory Databases: Making Compilation, Vectorization, and Prefetching Work Together at Last," Proc. of the VLDB Endowment, vol. 11, No. 1, 2017, pp. 1-13.

Müller, I. et al., "Adaptive String Dictionary Compression in In-Memory Column Store Database Systems," Open Proceedings, 10.5441/002/edbt.2014.27, 2014, pp. 283-294.

Müller, I. et al., "Retrieval and Perfect Hashing Using Fingerprinting." J. Gudmundsson and J. Katajainen (Eds.), SEA 2014: Experimental Algorithms, Springer International Publishing, 2014, pp. 138-149.

Nehme, R. and Bruno, N., "Automated Partitioning Design in Parallel Database Systems," In ACM SIGMOD, 2011, pp. 1137-1148.

Neumann, T., Efficiently Compiling Efficient Query Plans for Modern Hardware, Proc. of the VLDB Endowment, vol. 4, No. 9, 2011, pp. 539-550.

Nica, A. et al., "Statisticum: Data Statistics Management in SAP HANA," Proc. of the VLDB Endowment, vol. 10, No. 12, 2017, pp. 658-1669.

On, S.T. et al., "FD-Buffer: A Buffer Manager for Databases on Flash Disks," ACM CIKM '10, Oct. 25-29, 2010, pp. 1297-1300.

Oracle® Database—Database In-Memory Guide, 19c, E96137-03, downloaded from https://docs.oracle.com/en/database/oracle/oracle-database/19/inmem/, Copyright 2016, 2020, 255 pages.

Pathak, A. et al., "Adaptive storage and access for simplified data management," *DaMoN* '19, Jul. 1, 2019, 6 pages.

Plaisance, J. et al., "Vectorized VByte Decoding," 1$^{st}$ Int'l Symp. on Web AlGorithms, Jun. 2015, 7 pages.

Plattner. H., "The Impact of Columnar In-memory Databases on Enterprise Systems: Implications of Eliminating Transaction-Maintained Aggregates," Proc. of the VLDB Endowment, vol. 7, No. 13, Sep. 1-5, 2014, pp. 1722-1729.

Poess, M. and Potapov, D., "Data Compression in Oracle," Proc. of the VLDB Conference, 2003, pp. 937-947.

Sacco, G.M. and Schkolnick, M., "A Mechanism For Managing The Buffer Pool In A Relational Database System Using Tire Hot Set Model," Proc. of the Eighth Int'l. Conf. on Very Large Data Bases, Sep. 1982, pp. 257-262.

(56) References Cited

OTHER PUBLICATIONS

Sherkat, R. et al., "Page As You Go: Piecewise Columnar Access In SAP HANA," ACM SIGMOD '16, Jun. 26-Jul. 1, 2016, pp. 1295-1306.
Stoica, R. and Ailamaki, A., Enabling Efficient OS Paging for Main-Memory OLTP Databases. ACM DaMoN '13. 2013, 7 pages, 2013.
Willhalm, T. et al., "Vectorizing Database Column Scans with Complex Predicates," ADMS 2013, pp. 1-12.
Xie, D. et al., "Simba: Efficient In-Memory Spatial Analytics," ACM SIGMOD '16, Jun. 26-Jul. 1, 2016, pp. 1071-1085.
Zilio, D.C. et al., "DB2 Design Advisor: Integrated Automatic Physical Database Design," Procs. Of the $30^{th}$ VLDB Conference, 2004, pp. 1087-1097.

* cited by examiner

HYBRID IN-MEMORY/PAGEABLE SPATIAL COLUMN DATA

CROSS-REFERENCE TO RELATED APPLICATION

This application claims the benefit of U.S. Provisional Patent Application No. 62/858,693, filed on Jun. 7, 2019, which is herein incorporated by reference in its entirety.

BACKGROUND

Spatial databases may be hosted in an in-memory database to provide users with fast query access. An in-memory database can provide fast querying of spatial data by loading all data into heap memory from disk into memory before executing the query. However, spatial databases can be of a substantial size. As a result, users may be required to choose between storing subsets of the spatial database in the in-memory database or selecting expensive hardware for storing all of the data of the spatial database in the in-memory database. Users may thus be unable to query large spatial databases without expensive hardware.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
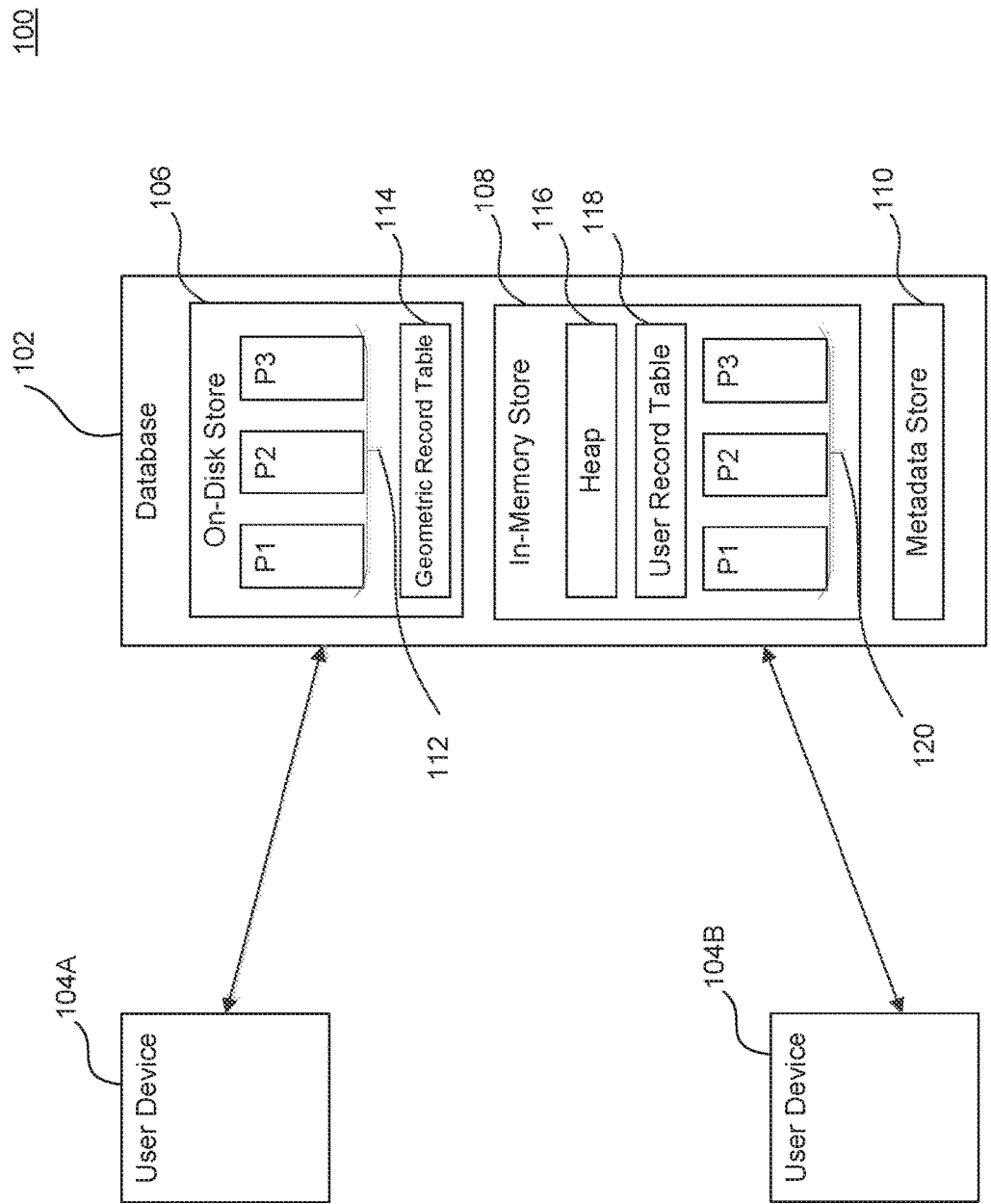
FIG. 1 illustrates a block diagram of a system for creating a footprint of geometric objects in an in-memory store, according to some embodiments.

Provided herein are system, apparatus, device, method and/or computer program product embodiments, and/or combinations and sub-combinations thereof, for creating footprints of geometric objects in an in-memory store.

In some embodiments, a database includes an on-disk store and an in-memory store. The on-disk store includes pages storing geometric objects via data blocks. Accordingly, in some embodiments, the on-disk store can store a geometric object on a single page via a single data block. In some embodiments, the on-disk store can store a geometric object across multiple pages via multiple data blocks. To locate geometric objects in the on-disk store, the database's on-disk store can maintain a geometric record table having records for each stored geometric object. Each record includes a pointer to a location of the geometric object's first data block in the on-disk store. The location can be a page and an offset on the page.

Upon receiving a request for a particular geometric object, the database creates a footprint for reading the geometric object on-demand at any time. The footprint of the geometric object can be developed differently based on whether the geometric object is stored on a single page or across multiple pages in the on-disk store. When the on-disk store stores the geometric object on a single page, the database can store the page of the geometric object in the in-memory store directly. When the on-disk store stores the geometric object across multiple pages in the on-disk store, the database can store a copy of the geometric object in one or more pages in the in-memory store's heap.

To determine whether the on-disk store stores the geometric object on a single page or across multiple pages, the database can use the geometric record table to obtain the location of the first page in the on-disk store that contains the first data block of the geometric object. The database can then load the first page into the in-memory store of the database. After loading the first page into the in-memory store, the database can examine the header of the geometric record's first data block to determine the size of the geometric object. Accordingly, the database can determine whether the on-disk store stores the geometric object on a single page or across multiple pages. If the on-disk store stores the geometric object on a single page, the database thus maintains the page loaded in the in-memory store via a page handle.

However, if the on-disk store stores the geometric object across multiple pages, the database can allocate a portion of memory equal to the size of the geometric object in a heap of the in-memory store. The database can then copy the portion of the geometric object provided in the first data block into the heap's allocated portion of memory. The database can subsequently load the pages containing the data blocks—storing portions of the geometric object—from the on-disk store into the in-memory store. After doing so, the database can then copy the geometric object stored on the pages into the heap's allocated portion of memory.

In either case, the database can create a user record for a user record table of the in-memory store. When the geometric object is stored entirely on a single page in the in-memory store, the user record can include a record number, a pointer, a page handler, and a reference count. When the heap stores the geometric object, the user record can include a record number, a pointer, and a reference count. The record number can be unique to the stored geometric object. The reference count can provide a number of different users referencing the geometric objects. The pointer can provide an in-memory address to the geometric object's first data block. The page handle maintains the page in the in-memory store for a predetermined amount of time. Consequently, the database can provide a footprint to accessing multiple geometric objects quickly without copying the geometric object from the on-disk store into the in-memory store each time they are referenced. As a result, users can query spatial databases efficiently regardless of the size of the database and the geometric object and without expensive hardware.

FIG. 1 illustrates system 100 for storing spatial data. System 100 includes database 102 and/or user devices 104A and 104B. Database 102 can be a spatial database storing a collection of spatial data describing the positions, shapes, and orientation of objects (e.g., geometric objects) defined in a predefined space. Database 102 can be in communication with user devices 104A-B and can receive a request to instantiate geometric objects.

Database 102 can include on-disk store 106, in-memory store 108, and/or metadata store 110. On-disk store 106 can include one or more pages 112 and geometry record table 114. Pages 112 can store the geometric objects. Geometry record table 114 can provide a location of geometric objects stored on pages 112. In some embodiments, pages 112 can store a fixed-length contiguous block of memory (e.g., virtual memory) in a columnar format. Pages 112 can have a predefined amount of storage capacity (e.g., 256K bytes). Accordingly, database 102 can store geometric objects on a single page 112 or across multiple pages 112. Thus, on-disk store 106 can provide a paged representation of geometric objects stored on pages 112 of on-disk store 106.

Figure 2:
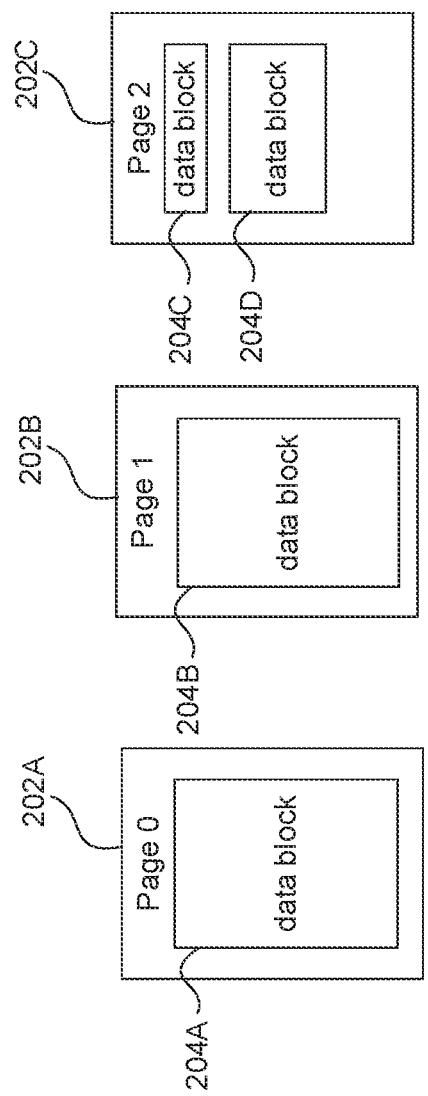
FIG. 2 illustrates a paged representation of geometric objects stored in an on-disk store, according to some embodiments.

FIG. 2 illustrates a paged representation of geometric objects stored in on-disk store 106, according to some embodiments. Database 102 (of FIG. 1) can analyze a chain of pages 202A-C, which may include page 202A, followed by page 202B, followed by page 202C, and followed by additional pages. As noted above, pages 202A-C can have a predefined amount of storage space (e.g., 256K). Accordingly, database 102 can then identify the first available page 202A having unutilized storage space. Page 202A can be completely unused or contain another geometric object's memory block.

Database 102 (of FIG. 1) can save a geometric object on page 202A entirely or across multiple pages 202A-C. In some embodiments, database 102 can analyze page 202A to determine if it has sufficient unutilized memory for storing the geometric object in its entirety. Where the entire geometric object can fit on page 202A, database 102 can create a single data block comprising each data byte of the geometric object and then can store the data block on page 202A. For example, as illustrated, database 102 can determine that the geometric object can be stored entirely on page 202A. Thus, database 102 can create a single data block 204A to include each data byte of the geometric object and store data block 204A on page 202A. In some embodiments, data block 204A can fully utilize page 202A's storage capacity. Data block 204A can also use a portion of page 202A's storage capacity.

However, when page 202A cannot store geometric object (e.g., based the geometric object being larger than the available space on page 202A), database 102 (of FIG. 1) can store the geometric object entirely on the next page 202B (if possible) or across multiple pages 202A-C in the same fashion. Thus, database 102 (of FIG. 1) can store one or more data blocks 204A-D for the geometric objects having a size based on the number of bytes of the geometric object and the amount of space available on pages 202A-C. In doing so, data blocks 204A-D cannot be larger than pages 202A-C.

For example, database 102 (of FIG. 1) can then determine that the geometric object is larger than page 202B. As illustrated, page 202B may be completely unused, and thus the geometric object can be larger than an unused page. However, in some embodiments, page 202B can store another geometric object's data block, and thus the geometric object can be larger than page 202B's remaining storage capacity. Accordingly, database 102 can create multiple data blocks 204B and 204C that each store one or more data bytes of the geometric object and forming the geometric object when combined. The number of bytes saved by data blocks 204B and 204C can depend on page 202B's and 202C's storage capacity. Accordingly, in some embodiments, as illustrated, data block 204B can include more bytes than data block 204C. Database 102 can then store data blocks 204B and 204C on pages 202B and 202C, respectively. In some embodiments, data block 204B can utilize the entire page 202B's capacity, and data block 204C can utilize a portion of pages 202C's capacity.

Along these lines, where a single page cannot store the geometric object, the database can store the geometric object across multiple pages 202A-C. Accordingly, database 102 (of FIG. 1) can create data blocks 204A-D of a particular size depending on the unutilized storage space of the pages 202A-C. In doing so, each data block 204A-D may include one or more bytes of the geometric object and together form the geometric object. Along these lines, each data block 204A-D can mirror the utilized storage space on the corresponding page 202A-C.

Further, blocks 204A-C can include a header and a payload. The header can include metadata unique to blocks 204A-C and optionally, metadata provided by a user. Metadata unique to block 202A-C can include the size of the geometric object and/or pages 202 storing the geometric object. Metadata provided by a user can be a particular size and/or type of a geometric object stored in payload 204. Further, payload 204 of blocks 204A-C can include data (e.g., bytes) of the geometric object.

Along these lines, database 102 (of FIG. 1) can align data blocks 204A-D on pages 202A-C. In doing so, in some embodiments, database 102 can offset each data block 204A-D by a nonzero number of bytes (e.g., 8 bytes, 16 bytes, 32 bytes) following the previous data block or the start of a new page 202A-C. Thus, database 102 can save data blocks 204A-D that is not the first data block on pages 202A-C at a byte divisible by the nonzero number of bytes (e.g., 16). For example, if data block 204C ends on page 202C's byte 120, data block 204C can store data block 204D at pages 202C's byte 128—which is the first byte after byte 120 divisible by 16. This can allow the data blocks to be loaded directly inside of pages 202A-C.

Additionally, after storing the geometric objects in on-disk store 106, database 102 can create a geometric record for geometric record table 114 (of FIG. 1). The geometric record can include a location of the geometric object's first data block on pages 202A-C in geometry record table 114. As described above, database 102 can store data blocks 204A-D on pages 202A-C in a columnar format. As also described above, pages 202A-C can be of a particular size (e.g., 256K bytes). Along these lines, geometric objects can be of various sizes and thus comprise different amounts of bytes. In turn, data blocks 204A-D can be of various sizes and therefore include varying amounts of bytes. Thus, the location of the geometric object's first data block can include a page number of the chain of pages (e.g., 0, 1, 2, etc.) and an offset from a particular page 202A-C. The offset can specify the location of the first byte of the geometric object's first block relative to a first byte (used or unused) of the residing page 202A-C. For example, since data blocks 204A and 204B are the first data blocks of their respective geometric objects and reside on pages 202A and 202B, their location can be page 202A, byte 0, and page 202B, byte 0, respectively. And since data block 204D follows data block 204C on page 202C, data block 204D's location can be page 202C, byte 120K (or some other nonzero number).

Figure 3:
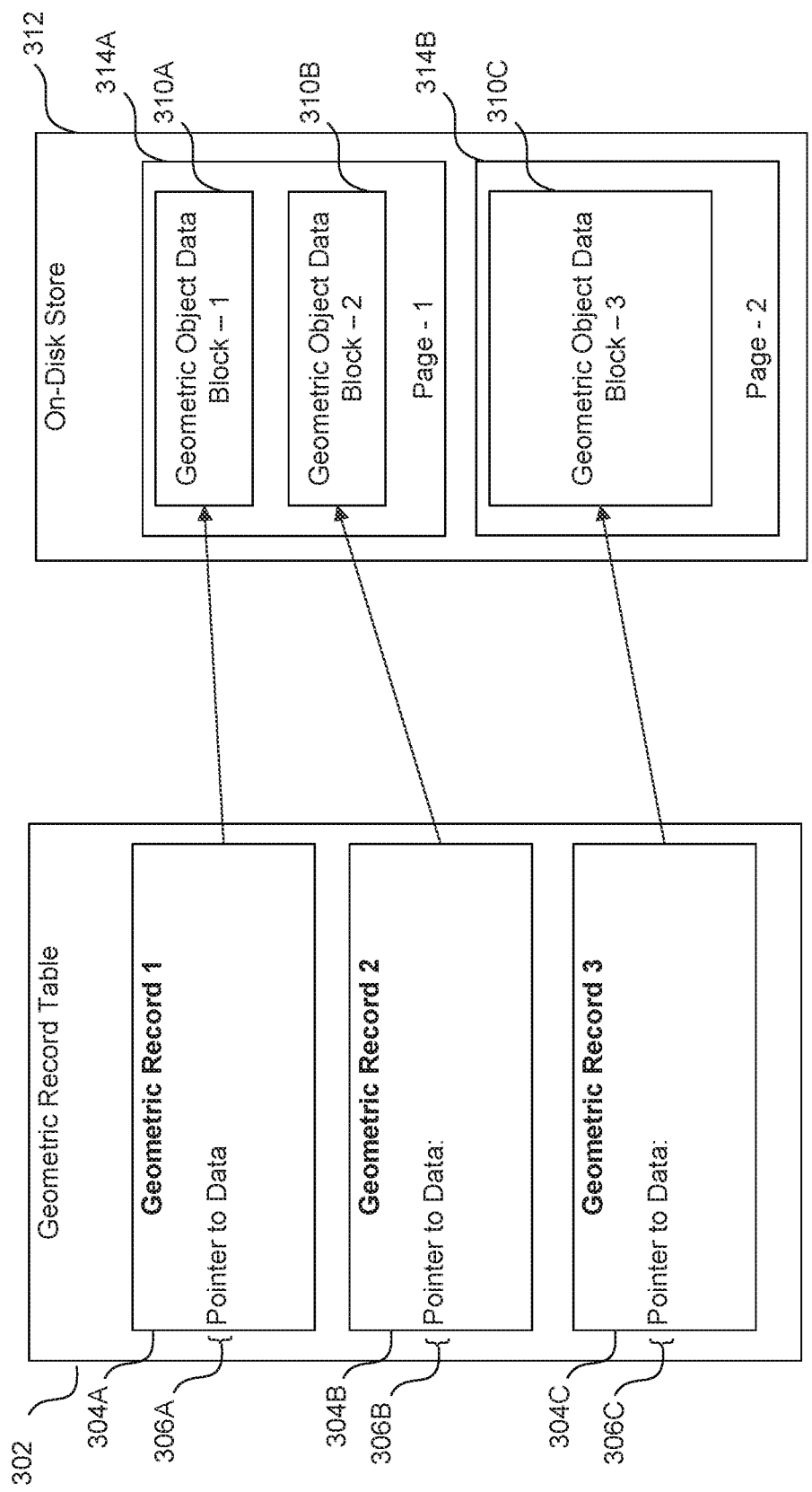
FIG. 3 illustrates geometric records of a geometric record table and a user record table, according to some embodiments.

FIG. 3 illustrates geometric records 304A-C of geometric record table 302, according to some embodiments. Geometric record table 302 can provide a vector of geometric records 302A-C in a column. Geometric records 304A-C can include pointer 306A-C and, optionally, record number (not illustrated). Pointers 306A-C can provide to a location of the geometric object's first data block 310A-C in on-disk store 312. As described above, on-disk store 312 can include one or more pages 314A and 314B, which, in turn, store one or more data blocks 310A-C storing one or more bytes of the geometric object. Accordingly, in some embodiments, pointers 308A-C can refer to a page number and an offset. The page number corresponds to a particular page 314A or 314B containing the geometric object's first data block 310A-C. And the offset corresponds to a number of bytes that the first byte of the geometric object's first data block 310A-C is from the first byte of the particular page 314 or 314B corresponding to the page number. Further, geometric record 302A-C's record number can be unique to the geometric object and can be sequential for each geometric record 302A-C in geometric record table 302. However, in some embodiments, record numbers may not be required. For example, geometric record table 302 can list the geometric records 304A-C in the same order that the on-disk store 312 stores the corresponding geometric objects 312A-C. Thus, database 102 (of FIG. 1) can infer geometric records 304A-C of corresponding geometric objects 310A-C based on the order.

Thus, as illustrated, geometric records 304A and 304B can refer to the same page 314A with their respective data block 310A and 310B's first-byte having different offsets. For example, geometric record 304A's pointer 308A can specify an offset of "0" such that geometric record 304A's data block 310A starts at the first byte of record 304A. Geometric record 304B's pointer 308B can specify an offset of "156" such that geometric record 304B's data block 310B starts at byte 156. Similarly, geometric record 304C's pointer 308C can specify a different page 314B from geometric record 304A and 304B's pointer 308A and 308B.

Figure 4:
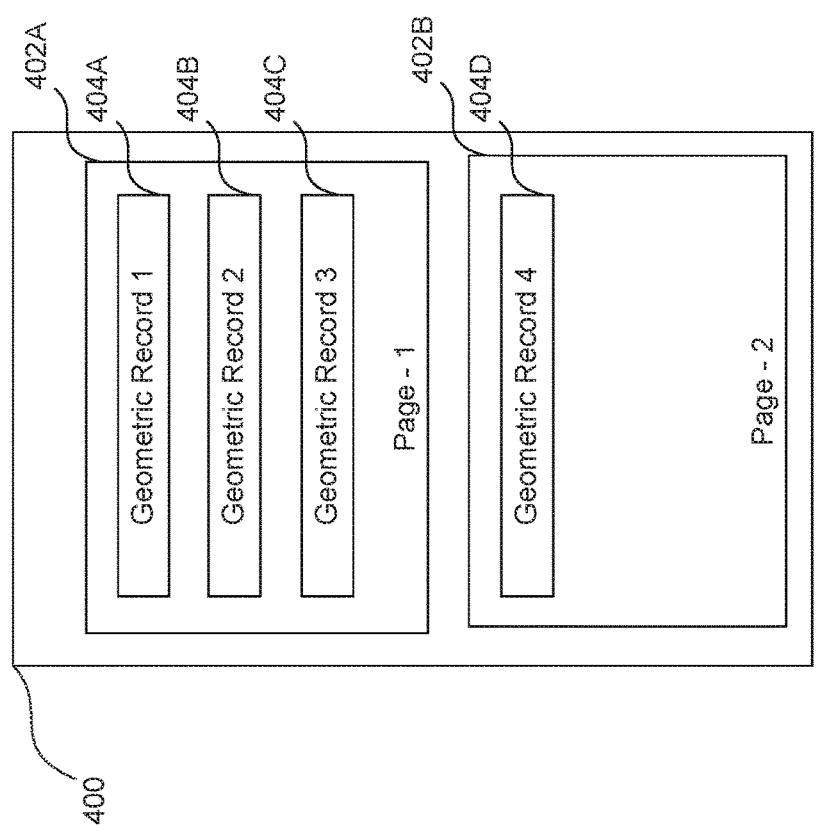
FIG. 4 illustrates a paged representation of in-memory geometric records, according to some embodiments.

Further, referring to FIG. 4, in some embodiments, geometric records 404A-D of geometric record table 304 (of FIG. 3) can be provided on one or more pages 402A and 402B of on-disk store 400. As stated above, pages 402A and 402B can have a predefined amount of storage space (e.g., 256K bytes). Along these lines, geometric records 404A-D can occupy a predefined amount of memory (e.g., 16K bytes) on pages 402A and 402B. Thus, upon page 402A not having sufficient memory for storing a geometric record 404D, database 102 (of FIG. 1) can save the geometric record 404D on the next page 402B.

Referring to FIG. 1, in-memory store 108 can include heap 116 and/or user record table 118. Heap 116 can include an allocated amount of data for storing copies of geometric objects, as will described in more detail below. User record table 118 can include a vector of geometric records, which each provide the locations of the requested geometric objects. In some embodiments, record table 118 can provide the geometric records in a column and one or more pages.

As will be explained in more detail below, in some embodiments, upon receipt of a user request for a specific geometric object stored in on-disk store 106, database 102 can determine the location of a particular geometric record corresponding to the geometric object stored in on-disk store 106. Referring to FIG. 4, as explained above, the on-disk store 400 can store the geometric records 404A-D on pages 402A and 402B. As also described above, pages 402A and 402B can have a predefined amount of storage space (e.g., 256K bytes), and geometric records 404A-D can occupy a predefined of storage (e.g., 16K bytes) on pages 402A and 402B. Further, the user request can include a record number corresponding to the specific geometric object. Thus, based on the record number, the amount of storage space of each page 402A and 402B, the amount of storage space occupied by each geometric record 404A-D, database 102 can determine a particular page 402A or 402B containing a particular geometric record 404A-D corresponding to the desired geometric object. For example, as illustrated, where each page 402A and 402B is 300K bytes, and each geometric record 404A-D requires 100K bytes, the fourth geometric record 404D can be located on the second page 402B.

After identifying a particular page 402B containing the geometric record 404D of the desired geometric object, database 102 (of FIG. 1) can inspect the geometric record 404D to determine the location of the geometric object in the on-disk store 106. As discussed above, the location of the geometric object relates to the first byte of the first block storing the geometric object. Accordingly, the geometric record 404D can provide the location as a page number of the page 314A and 314B in on-disk store 312—storing the data blocks 310A-C containing the geometric objects—and an offset of the first byte of the first data block storing the geometric object relative to the first byte of the page 402B.

Referring to FIG. 2, the database 102 can then load page 202A-C containing the first data block 204A-D of the desired geometric object from on-disk store 106 into in-memory store 108 (of FIG. 1), thereby providing a copy of the page 202A-C containing the first data block 204A-D of the desired geometric object into in-memory store 108. As discussed above, the first data block 204A-D of the desired geometric object's can include a header and a footer, where the header can include data relating to the size of the geometric object. Accordingly, database 102 can examine the header of the geometric object's first data block 204A-D to determine the size of the geometric object. For example, database 102 can determine whether the desired geometric object is stored entirely on a single page 202A-C or across multipole pages 202A-C. Thus, based on the size of the geometric object, database 102 can store the geometry object in in-memory store 108 directly or in heap 116 (of FIG. 1).

In some embodiments, database 102 (of FIG. 1) can determine that on-disk store 106 stores the geometric object on a single page 202A-C such that the geometric object is currently stored on the page 202A-C loaded into in-memory store 108 (of FIG. 1). Accordingly, database 102 can maintain the page 202A-C loaded into in-memory store 108 that includes a data block storing the desired geometric object. Further, in some embodiments, the loaded page 202C can store the desired geometry object that stores another geometry object partially or in its entirety. However, the storage of this other geometry object in part or entirely is incidental and inconsequential to storing the desired geometry object.

Conversely, after examining the header of the desired geometric object's first data block 204A-D, database 102 (of FIG. 1) can determine that the desired geometric object is stored across multiple pages 202A-C of on-disk store 106 (of FIG. 1). Thus, database 102 can determine that the desired geometric object is stored on the page 204A-D loaded in in-memory store 108 (of FIG. 1) and on one or more pages 204A-c stored in on-disk store 106. Database 102 can then allocate an amount of memory in heap 116 equal to the size of the geometric object. After doing so, database 102 can copy the data of the desired geometric object's first data block 204A-D from the page 202A-D loaded in in-memory store 108 into the allocated portion of heap 116 (of FIG. 1). Subsequentially, database 102 can load the next page 202A-C containing a data block 310A-C that stores a portion of the desired geometric object from on-disk stored 106 into in-memory store 108. After doing so, database 102 can copy the portion of the desired object stored on the page in in-memory store 108 into the allocated portion of heap 116. Database 102 can continue to do this until heap 116 stores the entire geometric object. Database 102 can discard the page 202A-C from the in-memory store 108 when heap 116 stores the entire geometric object.

Accordingly, referring to FIG. 1, in some embodiments, as illustrated, in-memory store 108 can include one or more pages 120. In-memory store 108's pages 120 may be copies of on-disk store 106's pages 112. When the geometric objects are stored on a single page 120, in-memory store 108 can maintain page 120 for a predetermined period of time, as will be discussed in more detail below. However, when the geometric objects are stored across multiple pages 120 or 120, in-memory store 108 can temporarily store pages 120 until the data of the desired geometric objects are copied into heap 116, as described above, subsequently, database 102 can discard page 120 containing only portions of the desired geometric object.

Further, after storing the geometric objects either on pages 120 in in-memory store 108 or in heap 116, database 102 can create a geometric record for in-memory store 108's user record table 118. Depending on whether the geometric object is stored on a single page or across multiple pages in on-disk store 106, the geometric record can include a record number, a pointer, and/or a page handle, as will be explained in greater detail below. The record number could provide a unique number of the record. The pointer can provide an in-memory address. The page handle can confirm that the page containing a particular geometric object is maintained in in-memory store 108.

Figure 5:
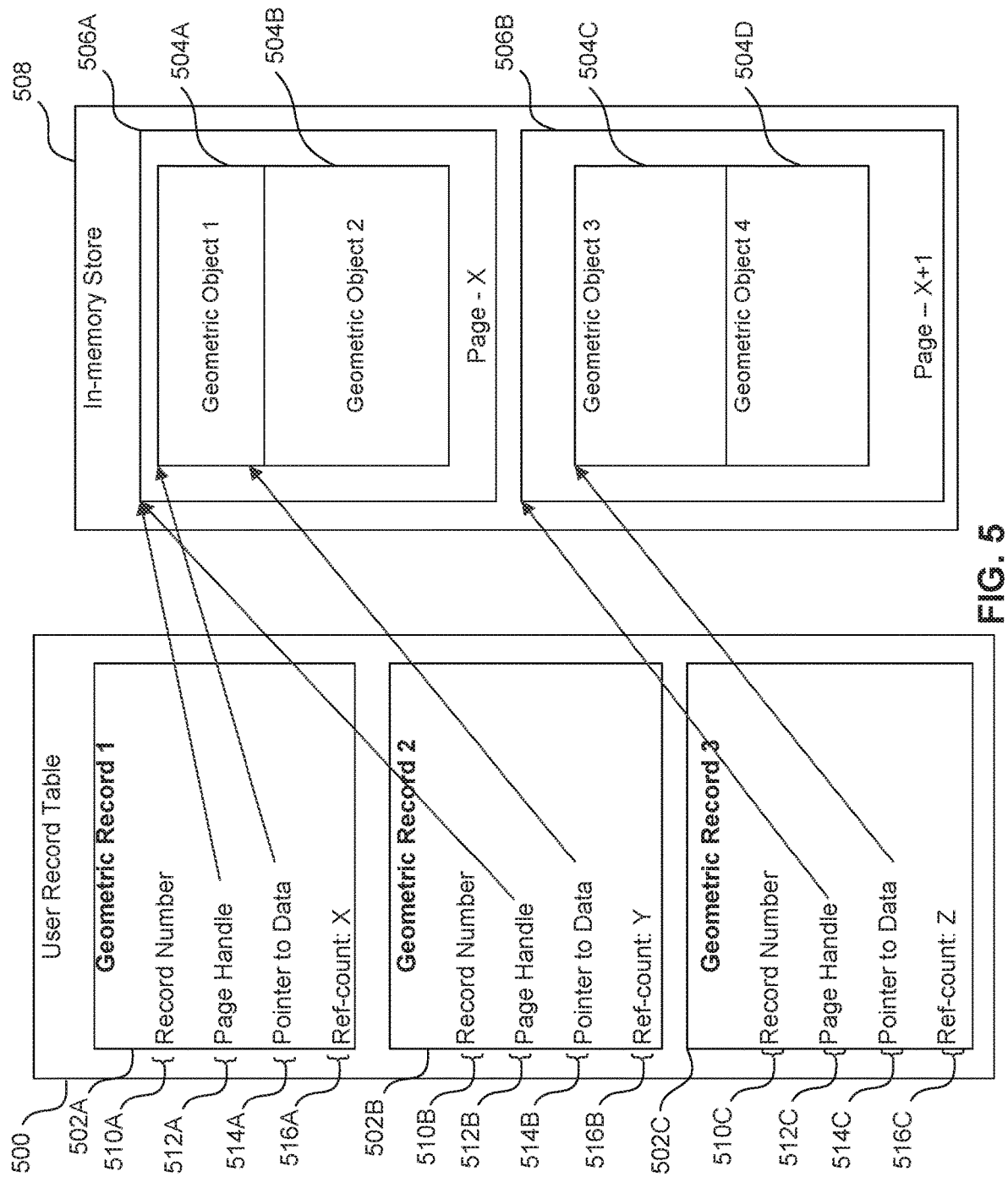
FIG. 5 illustrates geometric records of a user record table referencing geometric objects stored in an in-memory store, according to some embodiments
Figure 6:
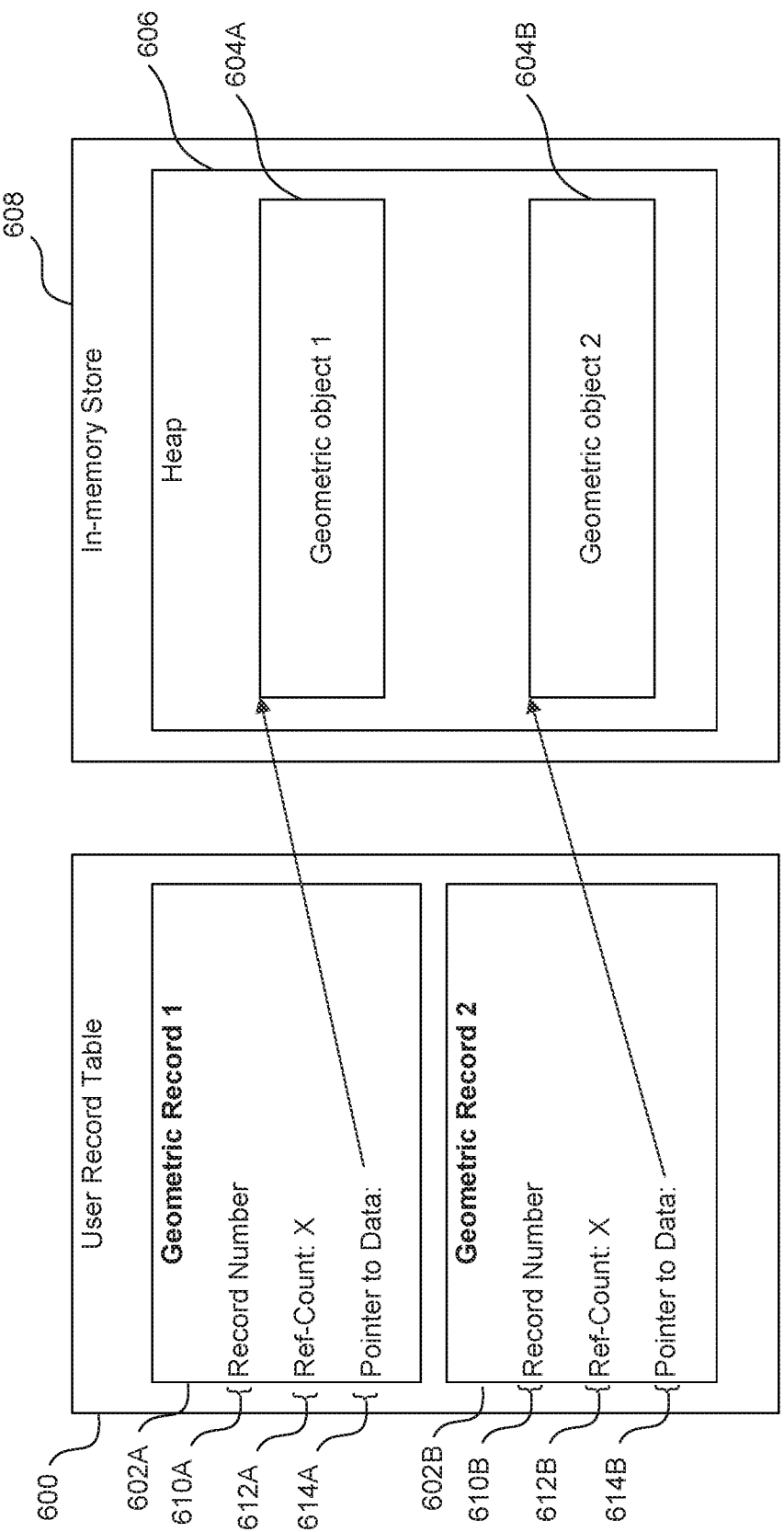
FIG. 6 illustrates geometric records of a user record table referencing geometric objects stored in a heap, according to some embodiments.

FIGS. 5 and 6 illustrate geometric records 502A-C, 602A, and 602B of user record tables 500 and 600, according to some embodiments. Although user record tables 500 and 600 are illustrated separately, geometric records 502A-C and 602A-C can be provided in the same user record table 500 or 600. User record table 500 and 600's geometric records 502A-C, 602A, and 602B reference copies of geometric objects 504A-D, 604A and 604B stored on a single page 506A or 506B or in heap 606 of in-memory store 508 and 608, according to some embodiments.

Referring to FIG. 5, as described above, on-disk store 106 can store each geometric object 504A-D on a single page 112 (of FIG. 1). Accordingly, when pages 506A and 506B containing geometric objects 504A-D are copied from on-disk store 106 into in-memory store 108, database 102 (of FIG. 1) provides a page handle 512A-C to maintain pages 506A and 506B in in-memory store 508. Thus, geometric records 502A-C—of geometric objects 504A-D stored entirely on a single page 506A and 506B—can include record number 510A-C, page handle 512A-C, pointer 514A-C, and/or reference counter 516A-C. Record number 510A-C can be a unique number assigned to the geometric object 504A-D. In some embodiments, the record numbers 510A-C can be sequential. Pointer 514A-C can point to a specific memory address in in-memory store 508, for example, at a particular location on page 506A and 506B stored in in-memory store 508. Reference counter 514 can be a number of times that a different user has requested the geometric object 504A-D, as will be explained in greater detail below. Accordingly, after storing a particular geometric object 504A-D in in-memory store 108 and creating the corresponding geometric record 502A-C in user record table 118, database 102 can provide the geometric record 502A-C, 602A, and 602B with a reference counter 516A-C of "1." which indicates that one user has requested this geometric object 504A-D.

Referring to FIG. 6, as described above, each geometric object 604A and 604B can be stored across multiple pages 112 in on-disk store 106 (of FIG. 1). Consequently, when requested by a user, copies of geometric objects 604A and 604B can be stored into an allocated portion of heap 606 of in-memory store 608. Thus, geometric records 602A and 602B—of geometric objects 604A and 604B stored in heap 606 of in-memory store 608—can include pointer 610A and 610B and Reference counter 612A and 612B. Pointer 610A and 610B can point to a specific memory address in heap 606 of in-memory store 608. Reference counter 612A and 612B can be a number of times that a different user has requested the geometric objects 604A and 604B, as will be explained in greater detail below.

Referring to FIG. 1, while creating geometric records 404A-C (of FIG. 1) for on-disk store 106's geometric record table 114 and/or in-memory store 108's user record table 118, database 102 can calculate statistics relating thereto. For example, database 102 can calculate the null row count or the first null row identifier. Database 102 can store the statistics in metadata store 110. The statistics can be utilized in processing user requests for geometric objects, thus improving the response rate of database 102 in providing search results.

Additionally, after creating user record table 118, database 102 can receive a request for a particular geometric object 504A-D, 604A, and 604B (of FIGS. 5 and 6). In response, database 102 can first search user record table 118 to determine if the requested geometric object 504A-D, 604A, and 604B is stored in heap 116 or pages 120 of in-memory store 108, for example, using a record number 510A-C, 610A, and 610B of a geometric record 502A-D, 602A, and 602B corresponding to the requested geometric object 504A-D, 604A, and 604B (of FIGS. 5 and 6). When the requested geometric object 504A-D, 604A, and 604B is stored in heap 116 or pages 120 of in-memory store 108, database 102 can instantiate the geometric object on-demand using the pointer 512A-C, 610A, and 612B of the geometric record 502A-C, 602A, and 602B. Along these lines, when a different user of user device 104A and 104B requests the geometric object 504A-D, 604A, and 604B, database 102 can increase the reference counter 514A-C, 612A and 612B of the corresponding geometric record 502A-C, 602A, and 602B, for example, from "1" to "2" and so on.

Further, as described above, in-memory store 108 can maintain pages 120 storing geometric objects 504A-D for corresponding geometric records 502A-D (of FIG. 5). However, in some embodiments, in-memory store 108's pages 120 may also store geometric objects not having corresponding geometric records 502A-D. Accordingly, after searching the user record table 118, database 102 can search pages 120 having for the requested geometric object 502A-D. In some embodiments, database 102 can identify the requested geometric object on pages 120, such that the requested object does not have a corresponding geometric record. By operating in such a manner, database 102 does not have to search from on-disk store 108 and load the same page from on-disk store 106 into in-memory store 108.

Further, after not identifying the requested geometric object through either using in-memory store 108's user record table 118 or searching pages 120, database 102 can then retrieve the geometric object from the on-disk store 106 as described above. For example, database 102 can identify a location of the geometric object on on-disk store 106's pages 112 using geometric record table 114. After identifying the one or more pages 112 storing the requested geometric object, database 102 can load a copy of the pages 112 into in-memory store 108 (illustrated as pages 120). When the requested geometric object is stored on a single page 112 and 120, database 102 can then provide a page handle 512A-C (of FIG. 5). Alternatively, when the requested geometric object is stored across multiple pages 112 and 120, database 102 can load a copy of the requested geometric object in heap 116. In either case, database 102 can create a record 502A-C, 602A, and 602B for user record table 116. The record 502A-C, 602A, and 602B can contain a pointer 514A-C, 610A, and 610B to the location of the geometric object's first byte on a page 120 or in heap 116.

Along these lines, referring to FIGS. 5 and 6, in some embodiments, as described above, when geometric objects 504A-D, 604A, and 604B are stored either on a single page 506A and 506B or in heap 606 and have corresponding geometric records 502A-C, 602A and 602B, database 102 (of FIG. 1) can receive a request from a different user for the geometric object 504A-D, 604A, and 604B. Accordingly, upon identifying instead of retrieving the requested geometric object 504A-D, 604A, and 604B from on-disk store 106 (of FIG. 1), database 102 can instantiate the requested geometric object 504A-D, 604A, and 604B directly from in-memory store 108. And, in doing so, without creating a new geometric record 502A-C, 602A and 602B, database 102 can increase the reference counter 516A-C, 612A, and 612B of the preexisting geometric object 504A-D, 604A, and 604B's geometric record 502A-C, 602A, and 602B.

Further, referring to FIG. 5, as also described above, database 102 (of FIG. 1) can maintain pages 506A and 506B in in-memory store 508 via page handle 512A-C when the requested geometric objects 504A-D is stored on a single page 506A and 506B entirely. Consequently, in some embodiments, although not illustrated, database 102 can maintain a page 506A or 506B having multiple geometric objects 504A-D, where one geometric object 504A-D corresponds to a geometric record 502A-C and another geometric object 504A-D does not correspond to any geometric record 502A-C. Accordingly, database 102 can receive a request for a geometric object 504A-D that is stored on page 506A or 506B—which is maintained in in-memory store 508 via page handle 512—and that does not correspond to any geometric record of user record table 500. Thus, in some embodiments, database 102 can instantiate the requested geometric object 504A-D without retrieving the page 112 (of FIG. 1) storing the requested geometric object 504A-D from on-disk store 106 (of FIG. 1). In doing so, database 102 can create a geometric record 502A-C for the user record table 500 corresponding to the requested geometric object 504A-D. As stated above, geometric record 502A-C can include page handle 512A-C.

Accordingly, referring to FIGS. 5 and 6, database 102 (of FIG. 1) can maintain geometric records 502A-C, 602A, and 602B in user record table 118 (of FIG. 1) while the same or different users continue to reference the geometric objects 504A-C, 604A, and 604B corresponding to the geometric records 502A-C, 602A, and 602B. After a user stops referencing geometric objects 504A-C, 604A, and 604B, depending on whether the geometric objects 504A-D, 604A, and 604B are stored in-memory store 508 or in heap 606, database 102 can determine whether to delete the corresponding geometric records 502A-C. 602A, and 602B and/or the pages 506A and 505B containing the geometric objects 504A-C, 604A, and 604B. For example, in some embodiments, referring to FIG. 5, when a user stops referencing a geometric object 504A stored in-memory store 508 directly, database 102 can determine whether to delete the corresponding geometric record 502A and/or the pages 506A containing the geometric object 504A. In determining whether to delete the corresponding geometric record 502A, upon the user stopping reference to the geometric object 504, database 102 can decrease the corresponding geometric record 502A's reference counter 516A by "1." Database 102 can maintain the corresponding geometric record 502A until the reference counter 516A reaches "0." Upon the reference counter 512A reaching "0," database 102 can delete the corresponding geometric record 502A.

Similarly, in determining whether to delete the copy of the geometric object 504A from in-memory store 508, database 102 (of FIG. 1) can determine if another geometric record 502B and 502C of other geometric objects 504B and 504C have page handles 512B and 512C to the page 506A storing the geometric object 504A. If geometric records 502B and 502C of other geometric objects 504B and 504C have page handles 512B and 512C to page 506A storing the geometric object 504A being deleted, database 102 can maintain the page 506A in in-memory store 508. However, if no geometric records 502B and 502C of other geometric objects 504B and 504C have page handles 512B and 512C to page 506 that stores the geometric object 504A being deleted, database 102 can delete the page 506A from in-memory store 508.

In the illustrated embodiment, upon the deletion of geometric record 502A, database 102 can determine that geometric record 502B has page handle 512B to page 506A storing geometric object 504A. Consequently, database 102 can maintain the page 506A in in-memory store 508. As illustrated, this can occur although geometric record 502B has pointer 514B to geometric object 504B on page 506A.

Further, in some embodiments, referring to FIG. 6, when a user stops referencing a geometric object 604A or 604B stored in heap 606 of in-memory store 608, database 102 (of FIG. 1) can determine whether to delete the corresponding geometric record 602A and 602B based on corresponding geometric record 602A and 602B's reference counter 612A and 612B. After a user stops referencing a geometric object 604A or 604B stored in heap 606 of in-memory store 608, database 102 can decrease the corresponding geometric record 602A and 602B's reference counter 612A and 612B by "1." Database 102 can maintain the corresponding geometric record 602A and 602B until the reference counter 612A and 612B reaches "0." Upon the reference counter 612A and 612B reaching "0," database 102 can delete the corresponding geometric record 602A and 602B.

Figure 7:
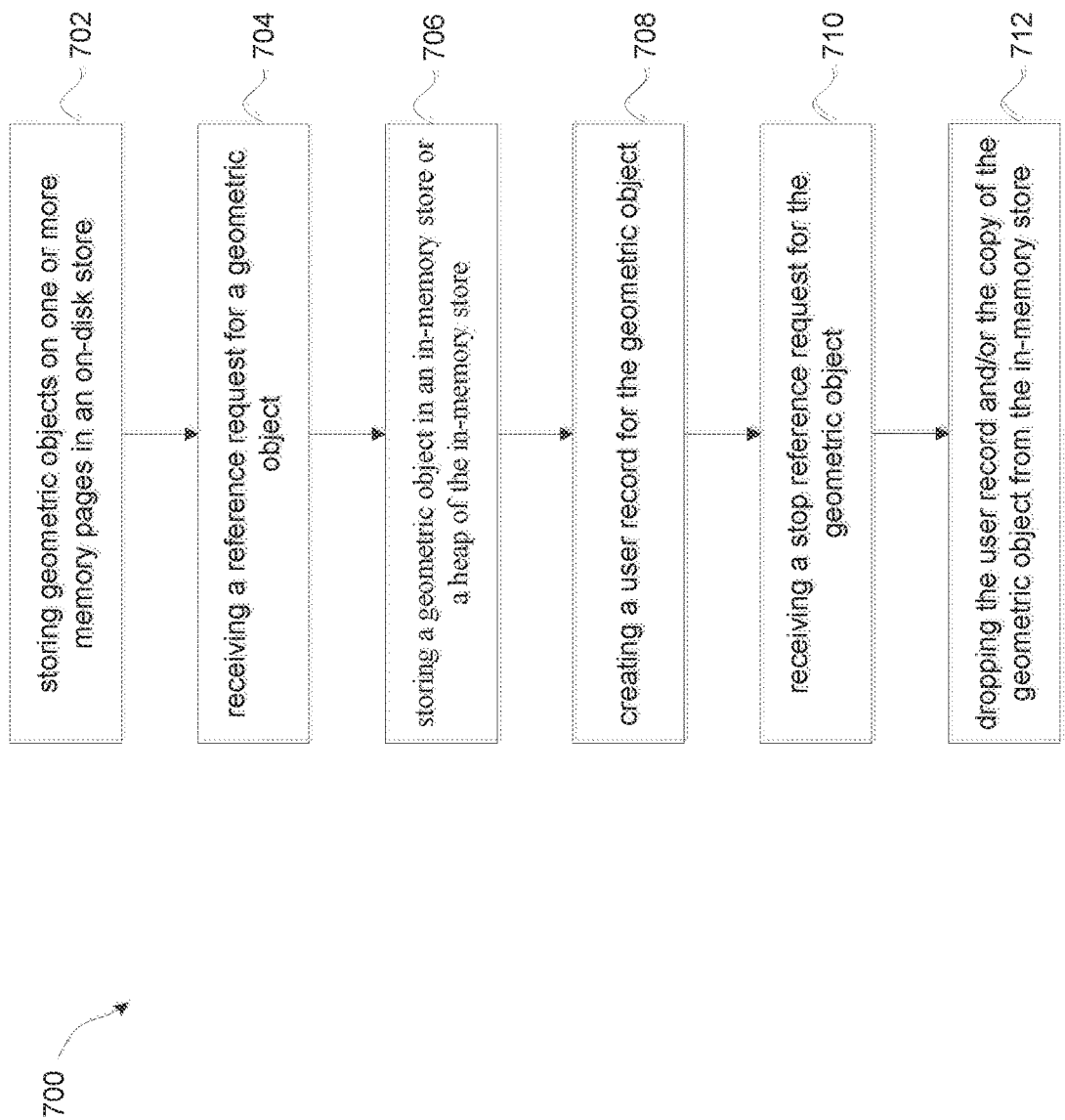
FIG. 7 is a flowchart illustrating a process for creating a footprint of geometric objects in an in-memory store, according to some embodiments.

FIG. 7 is a flowchart for a method 700 for storing a geometric object in a database, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 3, as will be understood by a person of ordinary skill in the art.

Method 700 shall be described with reference to FIGS. 1-6. However, method 700 is not limited to that example embodiment.

At 702, database 102 can store geometric objects on one or more pages 112 of on-disk store 106. The pages 112 may be part of a chain of pages 112 stored in on-disk store 106 sequentially. Further, the geometric objects can be stored on pages 202A-C via one or more data blocks 204A-D. Accordingly, data blocks 204A-D can be stored on pages 202A-C in a columnar fashion. Along these lines, some geometric objects can be smaller than a single page 202A-C and can be stored on a single data block 204A-D, which is stored on a single page 204A-C. Other geometric objects can be larger than a single page 202A-C and can be stored on multiple data blocks 204A-D spanning multiple pages 202A-C.

In some embodiments, 702 is optional. Geometric objects can be stored one or more pages 112 of on-disk store 106 in the fashion described in 702 by another database. Accordingly, database 102 can receive on-disk store 106 having geometric objects pre-stored on one or more pages 112.

At 704, database 102 can receive a request for a geometric object. In some embodiments, the request can be from a user at user devices 104A and 104B. The request may also be based on the workload of a user.

At 706, database 102 can load the geometric object in in-memory store 108 directly or in heap 116 of in-memory store 108. To do so, database 102 can determine the location of a particular geometric record corresponding to the geometric object stored in on-disk store 106 using geometric record table 114.

The on-disk store 400 can store the geometric records 404A-D on pages 402A and 402B. As also described above, pages 402A and 402B can have a predefined amount of storage space (e.g., 256K bytes), and geometric records 404A-D can occupy a predefined of storage (e.g., 16K bytes) on pages 402A and 402B. Further, the user request can include a record number corresponding to the specific geometric object. Thus, based on the record number, the amount of storage space of each page 402A and 402B, the amount of storage space occupied by each geometric record 404A-D, database 102 can determine a particular page 402A or 402B containing a particular geometric record 404A-D corresponding to the desired geometric object. For example, as illustrated, where each page 402A and 402B is 300K bytes, and each geometric record 404A-D requires 100K bytes, the fourth geometric record 404D can be located on the second page 402B.

After identifying a particular page 402B containing the geometric record 404D of the desired geometric object, database 102 can inspect the geometric record 404D to determine the location of the geometric object in the on-disk store 106. As discussed above, the location of the geometric object relates to the first byte of the first block storing the geometric object. Accordingly, the geometric record 404D can provide the location as a page number of the page 314A and 314B in on-disk store 312—storing the data blocks 310A-C containing the geometric objects—and an offset of the first byte of the data first block storing the geometric object relative to the first byte of the page 402B.

Database 102 can then load page 202A-C containing the first data block 204A-D of the desired geometric object from on-disk store 106 into in-memory store 108, thereby providing a copy of the page 202A-C containing the first data block 204A-D of the desired geometric object into in-memory store 108. As discussed above, the first data block 204A-D of the desired geometric object can include a header and a footer, where the header can include data relating to the size of the geometric object. Accordingly, database 102 can examine the header of the geometric object's first data block 204A-D to determine the size of the geometric object. For example, database 102 can determine whether the desired geometric object is stored entirely on a single page 202A-C or across multipole pages 202A-C. Thus, based on the size of the geometric object, database 102 can store the geometry object in in-memory store 108 directly or in heap 116.

In some embodiments, database 102 can determine that the geometric object is stored on a single page 202A-C of the on-disk store 106 such that the geometric object is currently stored on the page 202A-C loaded into in-memory store 108. Accordingly, database 102 can maintain the page 202A-C loaded into in-memory store 108 that includes a data block storing the desired geometric object.

Conversely, after examining the header of the desired geometric object's first data block 204A-D, database 102 can determine that the desired geometric object is stored across multiple pages 202A-C of on-disk store 106. Thus, database 102 can determine that the desired geometric object is stored on the page 204A-D loaded in in-memory store 108 and on one or more pages 204A-c stored in on-disk store 106. Database 102 can allocate an amount of memory in heap 116 equal to the size of the geometric object. After doing so, database 102 can copy the data of the desired geometric object's first data block 204A-D from the page 202A-D copied in in-memory store 108 into the allocated portion of heap 116. Subsequentially, database 102 can load the next page 202A-C containing a data block 310A-C that stores a portion of the desired geometric object from on-disk stored 106 into in-memory store 108. After doing so, database 1-2 can copy the portion of the desired object stored on the page in in-memory store 108 into the allocated portion of heap 116. Database 102 can continue to do this until the entire geometric object is stored in heap 116. Database 102 can discard the page 202A-C from the in-memory store 108 when the geometric object is entirely stored in heap 116.

In 708, database 102 can create a user record corresponding to the geometric object stored either in a page 120 of in-memory store 108 or in heap 116 of in-memory store. The user record can be for user record table 118 maintained by in-memory store 108.

As described above, each geometric object 504A-D can be stored on a single page 112 in on-disk store 106. Accordingly, when pages 506A and 506B containing geometric objects 504A-D are copied from on-disk store 106 into in-memory store 108, database 102 provides a page handle 512A-C to maintain pages 506A and 506B in in-memory store 508. Thus, geometric records 502A-C—of geometric objects 504A-D stored entirely on a single page 506A and 506B—can include record number 510A-C, page handle 512A-C, pointer 514A-C, and/or reference counter 516A-C.

As also described above, each geometric object 604A and 604B can be stored across multiple pages 112 in on-disk store 106. Consequently, when requested by a user, copies of geometric objects 604A and 604B can be stored into an allocated portion of heap 606 of in-memory store 608. Thus, geometric records 602A and 602B—of geometric objects 604A and 604B stored in heap 606 of in-memory store 608—can include pointer 610A and 610B and reference counter 612A and 612B.

In 710, database 102 can receive a stop reference request for the geometric object. This can be from the same or different user providing the reference request for the geometric object in 702.

In 712, database 102 can drop the user record and/or the geometric object from the in-memory store 108 or the heap 116. In some embodiments, when a user stops referencing a geometric object 504A stored in-memory store 508 directly, database 102 can determine whether to delete the corresponding geometric record 502A and/or the pages 506A containing the geometric object 504A. In determining whether to delete the corresponding geometric record 502A, upon the user stopping reference to the geometric object 504, database 102 can decrease the corresponding geometric record 502A's reference counter 516A by "1." Database 102 can maintain the corresponding geometric record 502A until the reference counter 516A reaches "0." Upon the reference counter 512A reaching "0," database 102 can delete the corresponding geometric record 502A.

Figure 8:
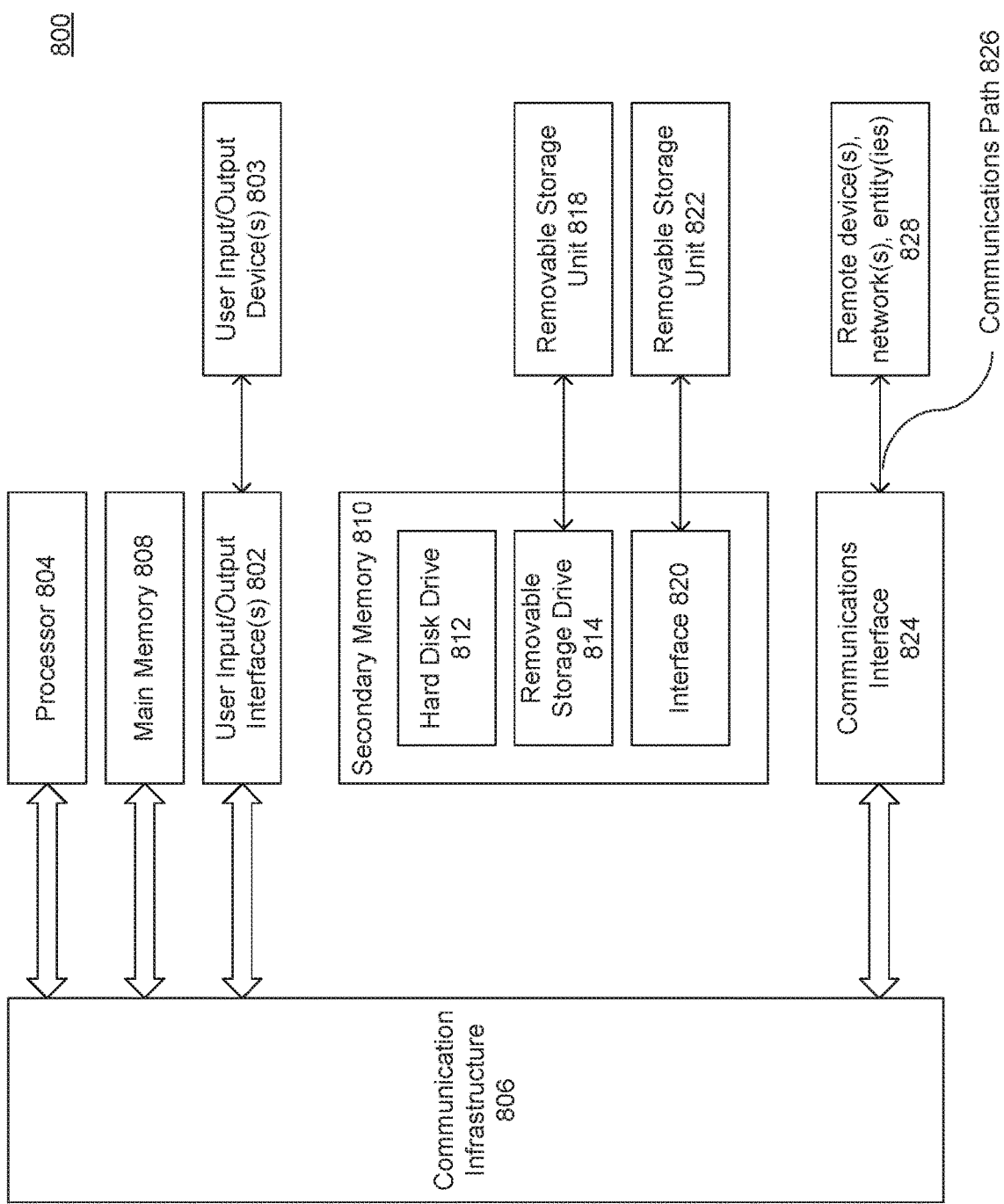
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer-usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for maintaining a first geometric object in a database, comprising:
    maintaining a first page storing a first data block in an on-disk store of the database, wherein the first data block stores at least one byte of the first geometric object;
    processing a request for the first geometric object;
    loading the first page from the on-disk store into an in-memory store of the database, thereby providing a copy of the first page in the in-memory store such that the copy of the first page stores a copy of the first data block comprising a copy of the geometric object;
    determining a size of the first geometric object based on the copy of the first data block; and
    storing the copy of the first geometric object in the in-memory store directly or a heap of the in-memory store based on the size of the first geometric object.

2. The computer-implemented method of claim 1, further comprising:
    after receiving the request for the first geometric object, identifying a location of the first geometric object in the on-disk store using a geometric record table maintained by the on-disk store,
    wherein the loading the first page from the on-disk store into the in-memory store of the database is based on the identifying of the location of the first geometric object in the on-disk store.

3. The computer-implemented method of claim 2, the identifying the location of the first geometric object in the on-disk store using the geometric record table comprising:
    identifying a page number and an offset of the first data block of the first geometric object in the on-disk store using the geometric record table maintained by the on-disk store.

4. The computer-implemented method of claim 1, the determining the size of the first geometric object comprising:
    examining a header of the copy of the first data block stored on the copy of the first page in the in-memory store such that the copy of the first data block includes the header and a payload,
    wherein:
    the header of the copy of the first data block includes the size of the geometric object, and
    the payload of the copy of the first data block includes the first byte of the geometric object.

5. The computer-implemented method of claim 1, the maintaining the first available page comprising:
    maintaining the first page storing the first data block and a second data block in the on-disk store of the database, wherein the first data block stores the at least one byte of the first geometric object, and wherein the second data block stores at least one byte of a second geometric object.

6. The computer-implemented method of claim 1, the determining the size of the first geometric object comprising:
    determining that the copy of the first data block comprises each byte of the first geometric object such that the first page stores the first geometric object in an entirety, and
    the storing the copy of the first geometric object comprising:
    maintaining the copy of the first page in the in-memory store of the database.

7. The computer-implemented method of claim 1, the maintaining the first page storing the first data block comprising:
    maintaining the first page and a second page storing the first data block and a second data block in the on-disk store of the database, respectively, wherein each of the first data block and the second data block stores at least one byte of the first geometric object,
    the determining the size of the first geometric object comprising:
    determining that the first geometric object is stored on the first page and the second page based on the copy of the first data block, and
    the storing the copy of the first geometric object comprising:
    storing the copy of the first geometric object in the heap of the in-memory store.

8. The computer-implemented method of claim 7, the storing the copy of the first geometric object in the heap of the in-memory store comprising:
  loading the copy of the first data block storing the at least one byte of the first geometric object into the heap of the in-memory store.

9. The computer-implemented method of claim 7, further comprising:
  allocating an amount of memory in the heap of the in-memory store that is equal to the size of the geometric object,
  wherein the storing of the copy of the first geometric object in the heap of the in-memory store is after the allocating of the amount of memory in the heap of the in-memory store that is equal to the size of the geometric object.

10. The computer-implemented method of claim 7, further comprising:
  loading the second page from the on-disk store into the in-memory store of the database, thereby providing a copy of the second page in the in-memory store such that the copy of the second page stores a copy of the the second data block, and
the storing the copy of the first geometric object in the heap of the in-memory store comprising:
  copying the copy of the first data block storing the at least one byte of the first geometric object into the heap of the in-memory store; and
  copying the copy of the second data block storing the at least one byte of the first geometric object into the heap of the in-memory store.

11. The computer-implemented method of claim 7, the maintaining the first page and the second page comprising:
  maintaining the first page and the second page storing the first data block and the second data block in the on-disk store of the database, respectively, wherein the first page or the second page stores a third data block storing at least one byte of a third geometric object.

12. The computer-implemented method of claim 1, further comprising:
  after storing the first geometric object in the in-memory store directly or the heap of the in-memory store, creating a user record of the first geometric object for a user record table maintained by the in-memory store of the database.

13. The computer-implemented method of claim 12, the creating the user record of the first geometric object for the user record table maintained by the in-memory store of the database comprising:
  determining a memory address of the the first geometric object in the in-memory store or the heap of the in-memory store;
  creating a pointer to the memory address of a first byte of the copy of the first data block; and
  creating the user record of the first geometric object for the user record table maintained by the in-memory store of the database, wherein the user record includes the pointer.

14. The computer-implemented method of claim 13, the creating the user record of the first geometric object for the user record table maintained by the in-memory store of the database comprising:
  determining a number of a user currently requesting the first geometric object,
  the creating the user record of the first geometric object for the user record table comprising:
  updating a reference counter based on the number of the user currently requesting the first geometric object, wherein the user record includes the pointer and the reference counter.

15. The computer-implemented method of claim 14, the creating the user record of the first geometric object for the user record table maintained by the in-memory store of the database comprising:
  when the copy of the first geometric object is stored in the in-memory store, creating a page handle for maintaining the first page in the in-memory store; and
  creating the user record of the first geometric object for the user record table maintained by the in-memory store of the database, wherein the user record includes the pointer, the reference counter, and the page handle.

16. A system, comprising:
a memory; and
a processor in communication with the memory and configured to:
  maintain a first page storing a first data block in an on-disk store of a database, wherein the first data block stores at least one byte of a first geometric object;
  process a request for the first geometric object;
loading the first page from the on-disk store into an in-memory store of the database, thereby providing a copy of the first page in the in-memory store such that the copy of the first page stores a copy of the first data block;
  determine a size of the geometric object based on the copy of the first data block; and
  storing the copy of the first geometric object in the in-memory store directly or a heap of the in-memory store based on the size of the first geometric object.

* * * * *